(12) United States Patent
Viera et al.

(10) Patent No.: US 8,131,636 B1
(45) Date of Patent: Mar. 6, 2012

(54) SYSTEM AND METHOD FOR PERFORMING FINANCIAL TRANSACTIONS ON A NETWORK

(75) Inventors: Edward John Viera, San Carlos, CA (US); Emerson Ward Swan, II, Redwood City, CA (US); Richard Klein, Lafayette, CA (US); Dmitri Boudtchenko, Mountain View, CA (US); James Howard Ballagh, Virginia Beach, VA (US)

(73) Assignee: Ensenta Corporation, San Mateo, CA (US)

( * ) Notice: Subject to any disclaimer, the term of this patent is extended or adjusted under 35 U.S.C. 154(b) by 956 days.

(21) Appl. No.: 11/123,507

(22) Filed: May 5, 2005

(51) Int. Cl.
   *G06Q 40/00* (2006.01)
(52) U.S. Cl. .......................................................... 705/38
(58) Field of Classification Search ..................... 705/38
   See application file for complete search history.

(56) References Cited

U.S. PATENT DOCUMENTS

| | | | |
|---|---|---|---|
| 2002/0174069 A1* | 11/2002 | LaBadie et al. | 705/40 |
| 2002/0198823 A1* | 12/2002 | Laederich et al. | 705/38 |
| 2004/0267660 A1* | 12/2004 | Greenwood et al. | 705/38 |
| 2005/0035191 A1* | 2/2005 | Latimer et al. | 235/379 |
| 2006/0106717 A1* | 5/2006 | Randle et al. | 705/45 |
| 2007/0110044 A1* | 5/2007 | Barnes et al. | 370/360 |

* cited by examiner

*Primary Examiner* — Alexander Kalinowski
*Assistant Examiner* — Hatem Ali
(74) *Attorney, Agent, or Firm* — Chad R. Walsh; Fountainhead Law Group PC

(57) ABSTRACT

Embodiments of the present invention include a computer-implemented method of performing a financial transaction on a network comprising storing a plurality of risk factors and associated severities in a web-enabled remote policy database, the severities defining actions taken when a specific risk factor is detected, storing a plurality of hold override policies that associate a deposit type with a hold type in the policy database, receiving deposit data including an image of a deposit check, applying the plurality of risk factors to the deposit data, and applying the plurality of hold override policies to the deposit data.

22 Claims, 16 Drawing Sheets

SYSTEM AND METHOD FOR PERFORMING FINANCIAL TRANSACTIONS ON A NETWORK

BACKGROUND

The present invention relates to electronic transactions, and in particular, to a system and method for performing financial transactions on a network.

Historically, financial transactions have been primarily a manual process, typically including a customer (e.g., a banking customer) and an employee of a financial institution (e.g., a banking teller). Recently, because of improvements in security systems and protocols, electronic financial transactions have become more common. One common system for performing electronic financial transactions is a financial network, such as the international ATM network. Such networks allow users to perform a variety of transaction without requiring the participation of a financial institution employee (e.g., a teller).

Most national financial networks are card-based. A consumer's bank (the "issuer" of the card) provides the consumer with a plastic card having a magnetic stripe and a numeric password. The consumer can use the card for cash withdrawal and transfer transactions at ATM's around the world. However, advanced functionality such as check withdrawals, immediate, local and non-local deposits, and instant payment on loan accounts are not currently available using existing technologies, such as an international ATM network switch. Therefore, financial institutions must implement their own proprietary networks to implement most advanced functionality. However, "foreign" account holders (e.g., account holders or account holders from other financial institutions) are restricted to a "lowest common denominator" transaction set supported by the international ATM network that provides connectivity between proprietary financial networks. This reduced transaction set does not provide many of the transaction types desired by consumers.

Thus, there is a need for an improved system and method for performing financial transactions on a network.

SUMMARY

Embodiments of the present invention include a computer-implemented method of performing a financial transaction on a network comprising storing a plurality of risk factors and associated severities in a web-enabled remote policy database, the severities defining actions taken when a specific risk factor is detected, receiving deposit data in a server from a kiosk over a network, applying the risk factors to the deposit data, and performing a first action corresponding to a first severity if one of said risk factors is detected.

In one embodiment, the policy database further comprises hold policies that associate a deposit type with a hold type.

In one embodiment, the method further comprises hold override policies defined by an issuer.

In one embodiment, severities are defined by at least two of a network, the issuer or the acquirer and the strictest severity is applied when a risk factor is detected.

In another embodiment, the present invention include a computer-implemented method of performing a financial transaction on a network comprising storing a plurality of risk factors and associated severities in a web-enabled remote policy database, the severities defining actions taken when a specific risk factor is detected, storing a plurality of hold override policies that associate a deposit type with a hold type in the policy database, receiving deposit data including an image of a deposit check, applying the plurality of risk factors to the deposit data, and applying the plurality of hold override policies to the deposit data.

The following detailed description and accompanying drawings provide a better understanding of the nature and advantages of the present invention.

BRIEF DESCRIPTION OF THE DRAWINGS

FIGS. 2A-F are example graphical user interfaces illustrating policy data according to embodiments of the present invention.

DETAILED DESCRIPTION

Described herein are techniques for performing transactions on a shared network. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Embodiments of the present invention include an account holder-number based network, rather than a card-based network. Registration and authentication capabilities may be integrated with an expanded transaction set of a shared branching network to provide self-service access to advanced functionality without the need for creating proprietary issuer networks. Previously, shared branching functionality was only available through costly teller-based transactions.

Figure 1:
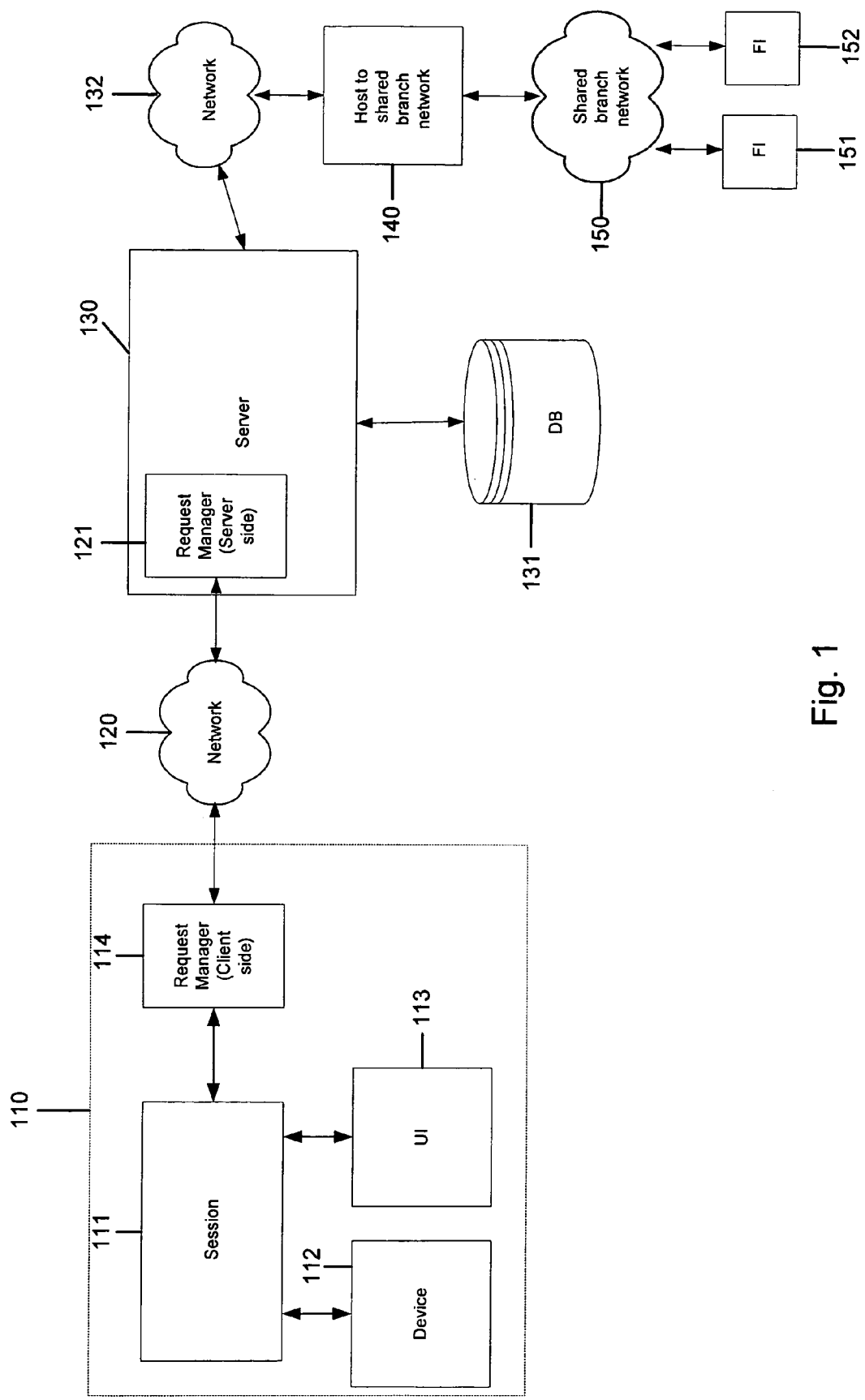
FIG. 1 is an example of a system for performing a financial transaction on a network according to one embodiment of the present invention.

FIG. 1 is an example of a system for performing a financial transaction on a network according to one embodiment of the present invention. System 100 includes financial kiosks 110 coupled to a server 130 over network 121 (e.g., the Internet) using a request manager 114 and 120. Server 130 is coupled to a web-maintained central database of policies and configuration items 131. Server 130 is also coupled to a shared branching network 150 through network 132 (e.g., the Internet) and a host 140. Shared branching network 150 may provide advance transaction set functionality between a plurality of financial institutions 151 and 152, for example.

Financial kiosk 110 may include software and hardware components, such as a user interface 113 and devices 112 controlled by session unit 111. User interface 113 may include a display and touch screen for providing input and output interface functionality. Session unit 111 may include software components for managing user transaction flow.

Device 112 may include a card reader, check scanner, check printer, and optical character recognition scanner. Request manager 114, on the client side, may include software and hardware components for sending and receiving procedures to and from the request manager 120 on the server side. Request manager 120 may include software and hardware components for controlling request activities between kiosk 110 and server 130 through an Internet-based network 121. Server 130 may include software and hardware components to enable communication between kiosk 110, database 131, and host 140. Server 130 processes data received from kiosk 110. It may send the data to be stored in or queried against database 131. It may also send data over an Internet-based network 132 to a shared branching network 150 through a host 140. Database 131 is a web-maintained central depository of policies and configuration items.

Host 140 may include hardware components that will allow kiosk 110 to access the shared branching network 150. A shared branching network is a national financial delivery channel for financial institutions ("FI") such as 151 and 152 used to provide account holders convenient locations and hours. A shared branching network includes software protocols that support enhanced functionality that allows account holders (i.e., customers of different financial institutions) to conduct a wide variety of real-time transactions such as deposits, withdrawals, loan applications and disbursements, balance inquiries, or wire transfers. Account holders of participating financial institutions may conduct business at any of the "shared" facilities as though they were at their "home" financial institution.

Figure 2A:
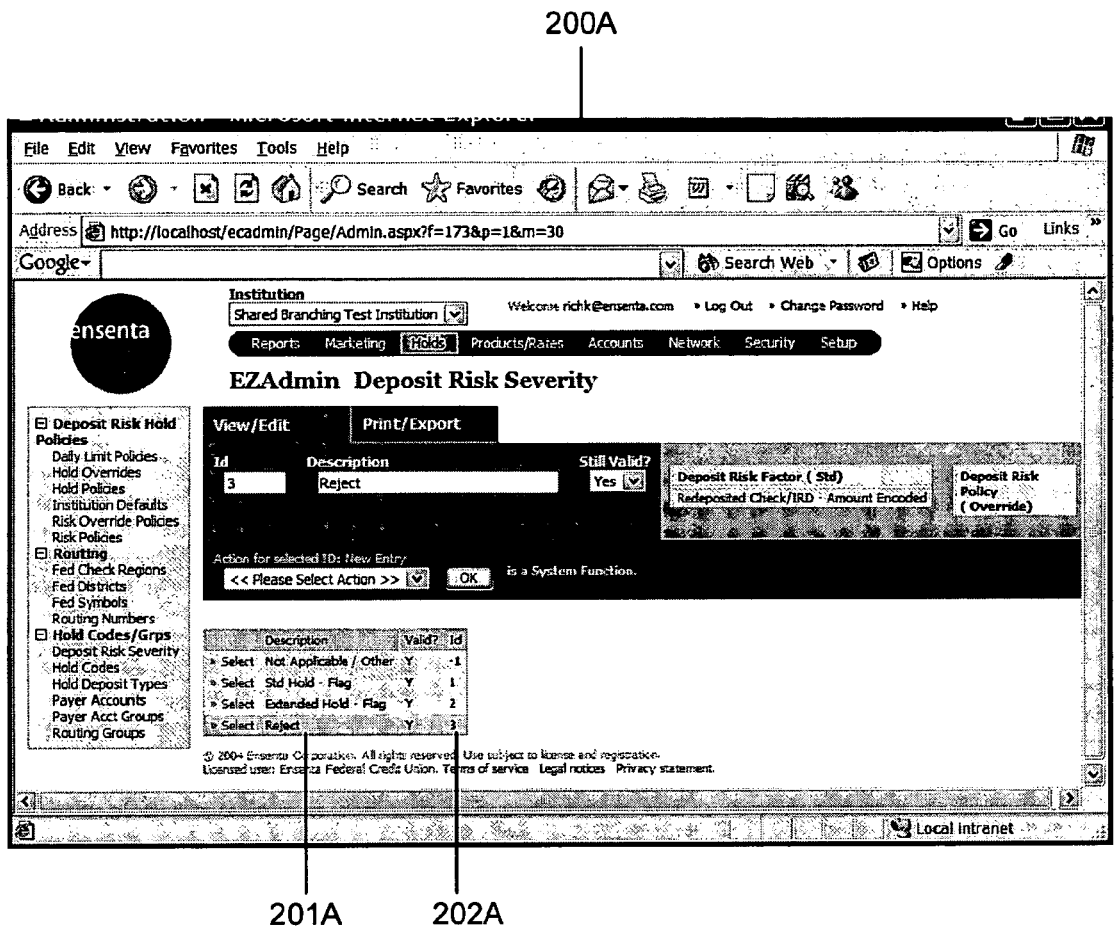

FIG. 2A is an example graphical user interface ("GUI") 200A illustrating policy data according to one embodiment of the present invention. In one embodiment, the present invention includes features to allowing a user to make a deposit in a kiosk. For example, a user may make a deposit, and the system may gather information about the deposit in order to manage risk and control the transaction. The analysis may include applying a variety of criteria or conditions ("Risk Factors") to the data associated with the deposit transaction. If any of the risk factors are present, the system may take further steps based on the particular risk factor that is triggered. The present example illustrates a GUI that is used for entering deposit risk severity codes into a web-based policy database (e.g. database 131 in FIG. 1). A deposit risk severity is the action taken when a specific risk factor is detected. A description 201A of the action taken is entered and an ID 202A is assigned. These are default actions and are defined at the shared branching network level (e.g., by a shared branching network administrative authority). Deposit risk severity information and codes may be stored in a policy database and may cause a deposit to be rejected or cause a standard hold or extended hold to be placed on the deposit, for example. A user in a financial institution (e.g., an employee of a financial institution) may define and modify the risk severity information that is stored remotely in a web-enabled remote policy database. If a user makes any changes, the new data will be written to the remote policy database. This remote policy database can be accessed over the internet using secure communications protocols such as TCP/IP or SOAP, for example.

Figure 2B:
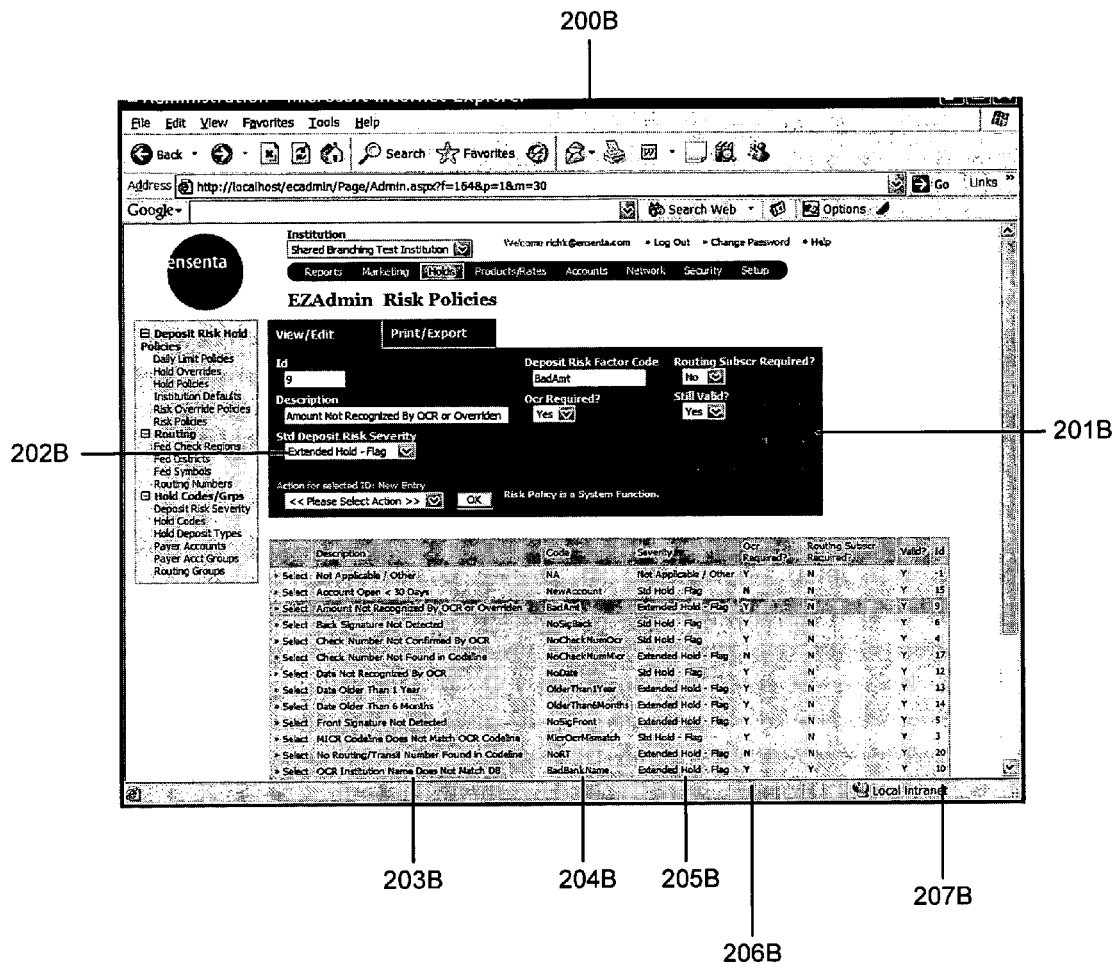

FIG. 2B is another example GUI 200B illustrating policy data according to another embodiment of the present invention. The present example illustrates a GUI that allows a user to view risk policy data, which includes a listing of risk factors. As mentioned above, risk policies are used to control deposit transactions that occur on a kiosk. As described in more detail below, information associated with each deposit transaction may be analyzed against the risk policies in a central database to control the transaction (e.g., the availability of cash). Risk policies can be set by the network (e.g., as shared branching network rules defined by a central network administrative authority), the issuer (i.e., the financial institution of the depositor), or the acquirer (the kiosk owner). These may be default policies defined at the network level. These policies are maintained by authorized users in a web-based administrative site, such as database 131 of FIG. 1. Risk policies may include a description of each risk factor 205B, a code 206B, severity 207B, an OCR requirement 208B and an ID 209B, for example. Risk factors 205B are conditions for controlling the processing of a deposit. Information associated with each deposit may be analyzed against one or more risk factors for controlling the steps taken in a deposit transaction. A list of example risk factors and example severities are shown in Table 1.

TABLE 1

| RISK FACTOR | SEVERITY |
|---|---|
| Account Open <30 Days | Std Hold—Flag |
| Amount Not Recognized By OCR or Overriden | Extended Hold—Flag |
| Back Signature Not Detected | Std Hold—Flag |
| Check Number Not Confirmed By OCR | Std Hold—Flag |
| Check Number Not Found in Codeline | Extended Hold—Flag |
| Date Not Recognized By OCR | Std Hold—Flag |
| Date Older Than 1 Year | Extended Hold—Flag |
| Date Older Than 6 Months | Extended Hold—Flag |
| Front Signature Not Detected | Extended Hold—Flag |
| MICR Codeline Does Not Match OCR Codeline | Std Hold—Flag |
| No Routing/Transit Number Found in Codeline | Extended Hold—Flag |
| OCR Institution Name Does Not Match DB | Extended Hold—Flag |
| OCR Institution Name Not Found | Std Hold—Flag |
| One or more MICR codes unreadable | Extended Hold—Flag |
| Payee Does Not Match Acct Holder, Inst or "Cash" | Std Hold—Flag |
| Post Dated | Extended Hold—Flag |
| Redeposited Check/IRD—Amount Encoded | Reject |
| Routing Digit, Length, Branch, or Series Invalid | Extended Hold—Flag |
| Routing Number Check Digit Incorrect | Extended Hold—Flag |
| Routing Number Not In Database | Extended Hold—Flag |

For example, if a depositor's account is open for less than 30 days, the deposit may be processed differently than if the account were open for more than 30 days. Example risk factors are also illustrated at 205B. Each risk factor may be assigned a code 206B. A severity 207B is associated with each risk factor. Severity may be selected by a user at a financial institution, for example, using drop down menu 202B. Severities may be standard (i.e., default) or customized by an issuer (e.g., a financial institution) or acquirer (e.g., the owner of a kiosk) as described below. 208B shows whether OCR is required for the risk factor to be applied. For example, if OCR is unavailable at the time of deposit, one or more risk factors that require OCR may not be operable. However, other risk factors that do not require OCR may still be operable. Thus, if a financial institution has specified a risk factor that requires OCR, a deposit cannot be processed if the OCR component of the kiosk is not functioning. An ID 209B may be assigned to each risk policy. If a user (e.g., an authorized employee at a financial institution) makes any policy changes or adds a new policy, the new data will be written to a web-enabled remote policy database. This remote policy database can be accessed over the Internet using secure communications protocols such as TCP/IP or SOAP.

In 201B, a user can access, modify or define policies. For example, a user may set the ID, code, and severity for a new risk policy or change the information associated with an existing risk policy (e.g., changing a deposit risk severity for a particular risk factor). Features and advantages of the present invention include allowing users to access policy data in a remote database and define, modify, or otherwise manage such data remotely to control the flow of deposits and other transactions in a remote kiosk.

Figure 2C:
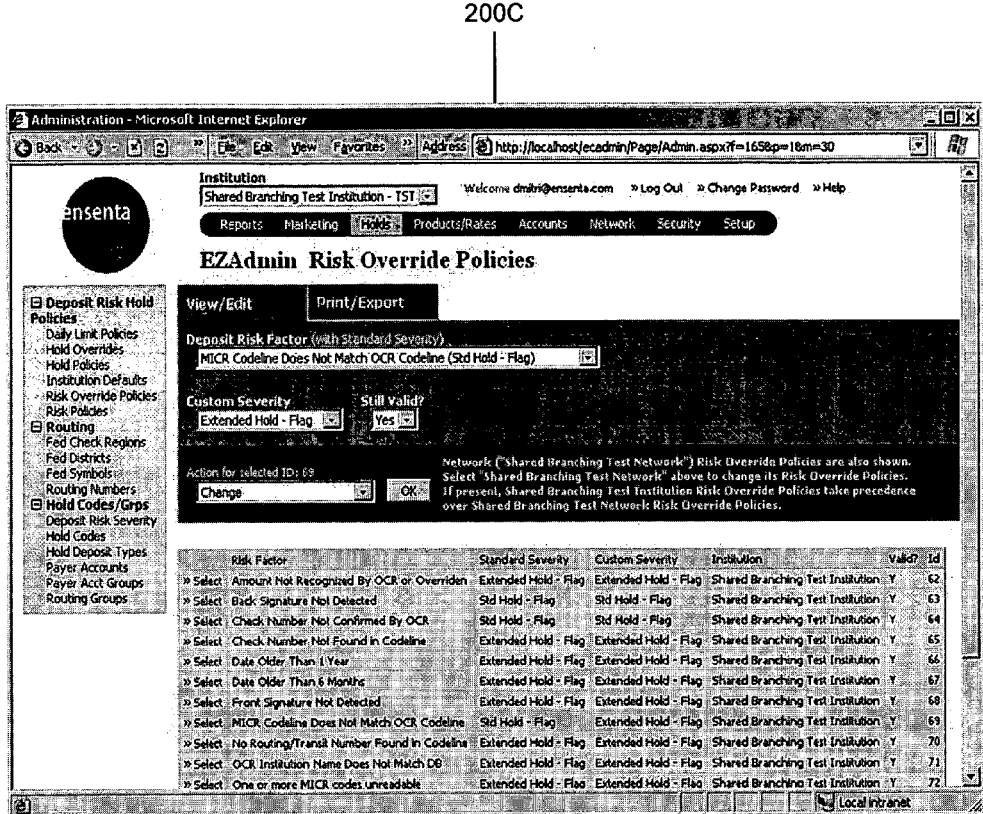

FIG. 2C is another example GUI 200C illustrating policy data according to another embodiment of the present invention. GUI 200C illustrates the each risk factor may be associated with multiple severities. For example, the network may set a severity, the issuer may set another severity, and the acquirer may set yet another severity. The network severity is typically the default severity. The issuer severity and acquirer severity are override severities that are applied to increase the security over and above that provided by the network. For example, in one embodiment the most severe policy of all available policies is applied. For example, a network-defined severity for a particular risk factor might be an extended hold. The issuer-defined severity for the same risk factor is to reject. The most severe policy of the two will apply. In this example, the issuer-defined policy will take precedence and the deposit will be rejected. These policies are maintained by authorized banking institution users in a web-based administrative site.

The present example also illustrates a GUI that is used for managing risk override policies. These override policies will typically be set by an issuer or acquirer to override the default network severities. In 201C, a user can select an override severity that will apply when the standard severity that was set in 200B (e.g., by the network) is overriden. A description 202C of the risk factor is given. The standard severity 203C for each risk factor is displayed. A custom severity 204C which will override the standard severity for a particular risk factor is displayed. The name of the institution 205C is also displayed. An ID 206C is assigned to each policy that has an override. If a user enters a risk override, the new data will be written to a web-enabled remote policy database. This remote policy database can be accessed over the internet using secure communications protocols such as TCP/IP or SOAP.

Figure 2D:
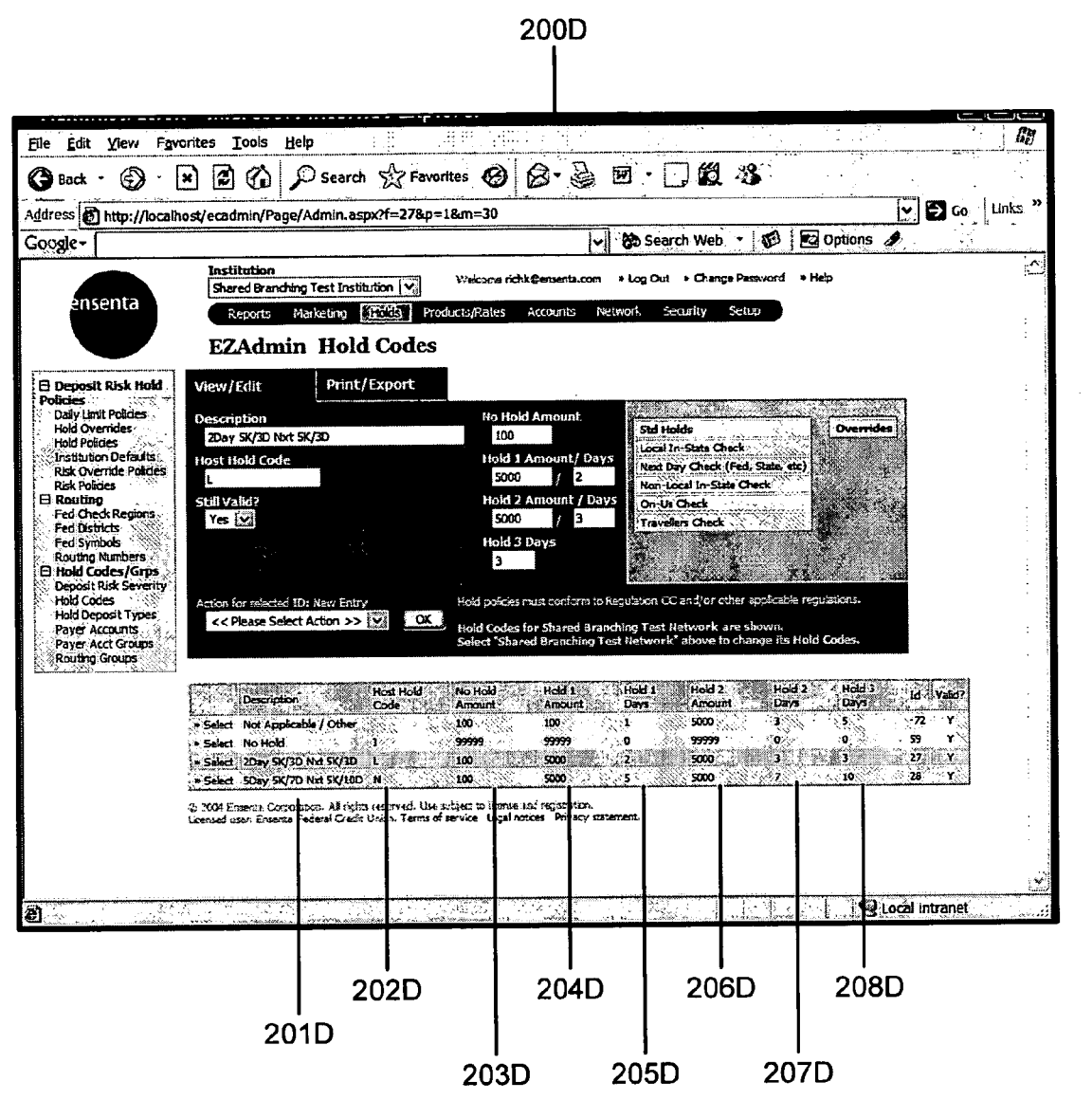

FIG. 2D is another example GUI 200D illustrating policy data according to embodiments of the present invention. The present example illustrates a GUI that lists available hold codes. These codes are defined at the shared branching network level. In this example, there are three codes that are supported by the shared branching network: no hold and holds with two different fund release schedules. The present example illustrates one hold with a fund release schedule that allows $100 to be released immediately (no hold), $5000 to be released after 2 days and $5000 to be released in successive 3 day increments. It is to be understood that any of a variety of hold schedules or rules may be defined. A description 201D of the hold is displayed. A hold code 202D is assigned to each hold type. A "no hold" amount 203D is displayed. This is an amount that is available instantly at the time of deposit. A "hold 1" amount 204D is displayed. This is an amount that is available after a specified number of days 205D after the initial deposit. There is a "hold 2" amount 206D that is displayed. This is an amount that is available after a specified number of days 207D after amount 204D has become available. If there is still a remaining balance on the deposit, it will become available after "hold 3" days 208D.

Figure 2E:
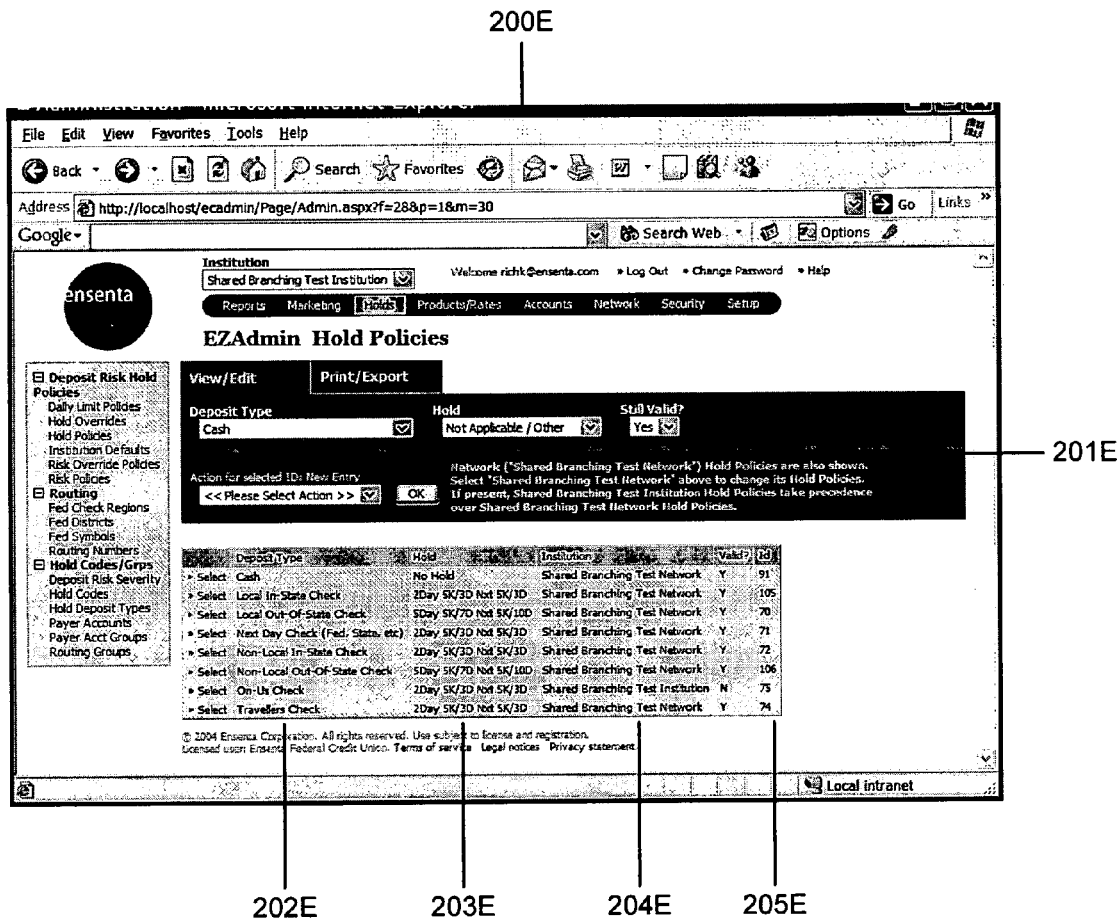

FIG. 2E is another example GUI 200E illustrating policy data according to embodiments of the present invention. The present example illustrates hold policies. Hold policies associate a deposit type with a hold type. As shown in GUI 200E, a variety of different deposit types 202E may occur at a kiosk. Interface 201E allows a user to view the list of deposit types and what type of hold is associated with each deposit type. These may be default hold policies defined by at shared branching network level. An authorized institution user (e.g., an employee of an issuer) can change the default policy for any deposit type as shown in 201E. If a user makes any policy changes or adds a new policy, the new data will be written to a web-enabled remote policy database. This remote policy database can be accessed over the internet using secure communications protocols such as TCP/IP or SOAP. A deposit type 202E is displayed. A hold code 203E is listed for each deposit type. The name of the institution 204E that defined a particular hold policy is displayed.

Figure 2F:
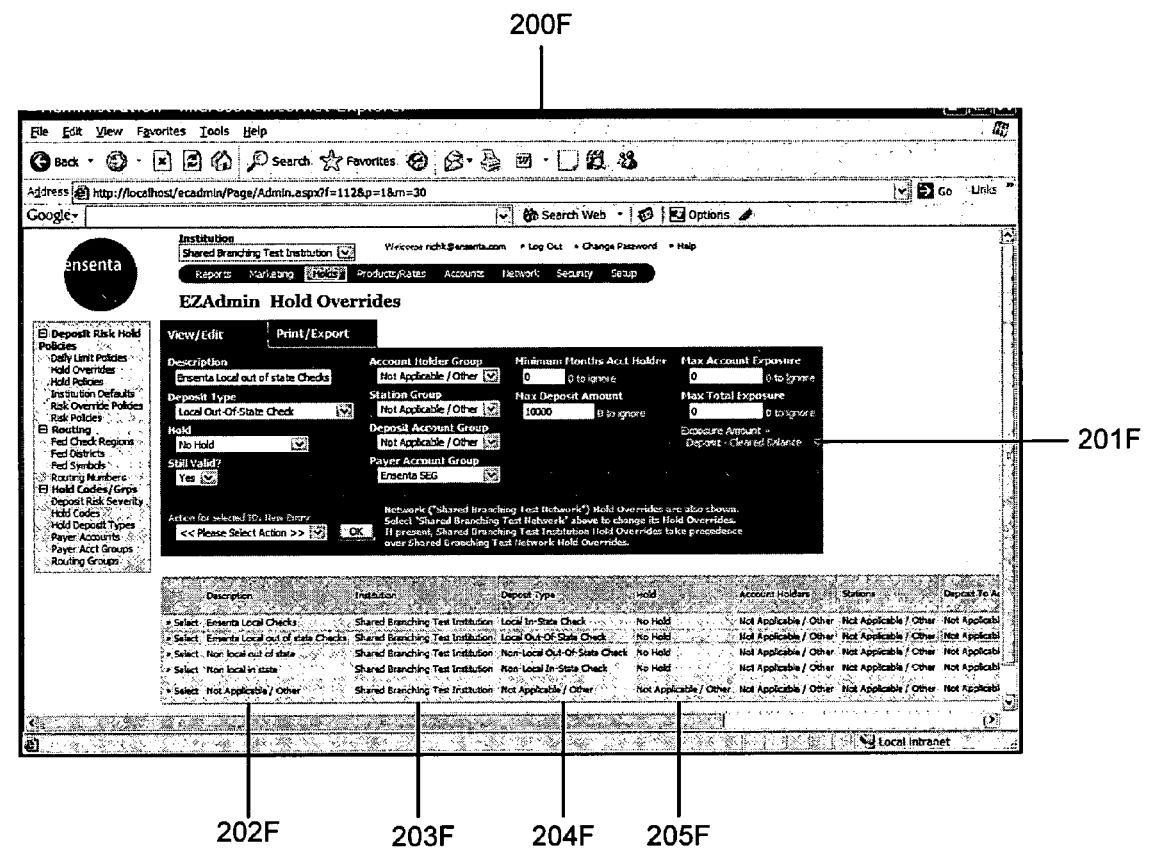

FIG. 2F is another example GUI 200F illustrating policy data according to another embodiment of the present invention. The present example illustrates a GUI that is used for the entry of hold override policies as shown in 201F. A description 202F is displayed. The name of the institution 203F that defined the override will be displayed. A deposit type 204F is displayed. A new hold code 204F for the override is also displayed. Hold overrides are defined to give certain account holders quicker access to their deposit funds. For example, under a default hold policy (e.g., as defined by the network) for a non-local out of state check deposit, a hold for a specified amount and time is placed on it. A issuer can override this by defining a "no hold" policy on this deposit type. In other words, the account holder will have immediate access to the deposit funds. Issuers might also define hold overrides for account holders that have been long time customers of the institution. These policies take precedence over the default hold policies. If a issuer enters a hold override, the new data will be stored in a web-enabled remote policy database. This remote policy database can be accessed over the internet using secure communications protocols such as TCP/IP or SOAP.

Figure 3:
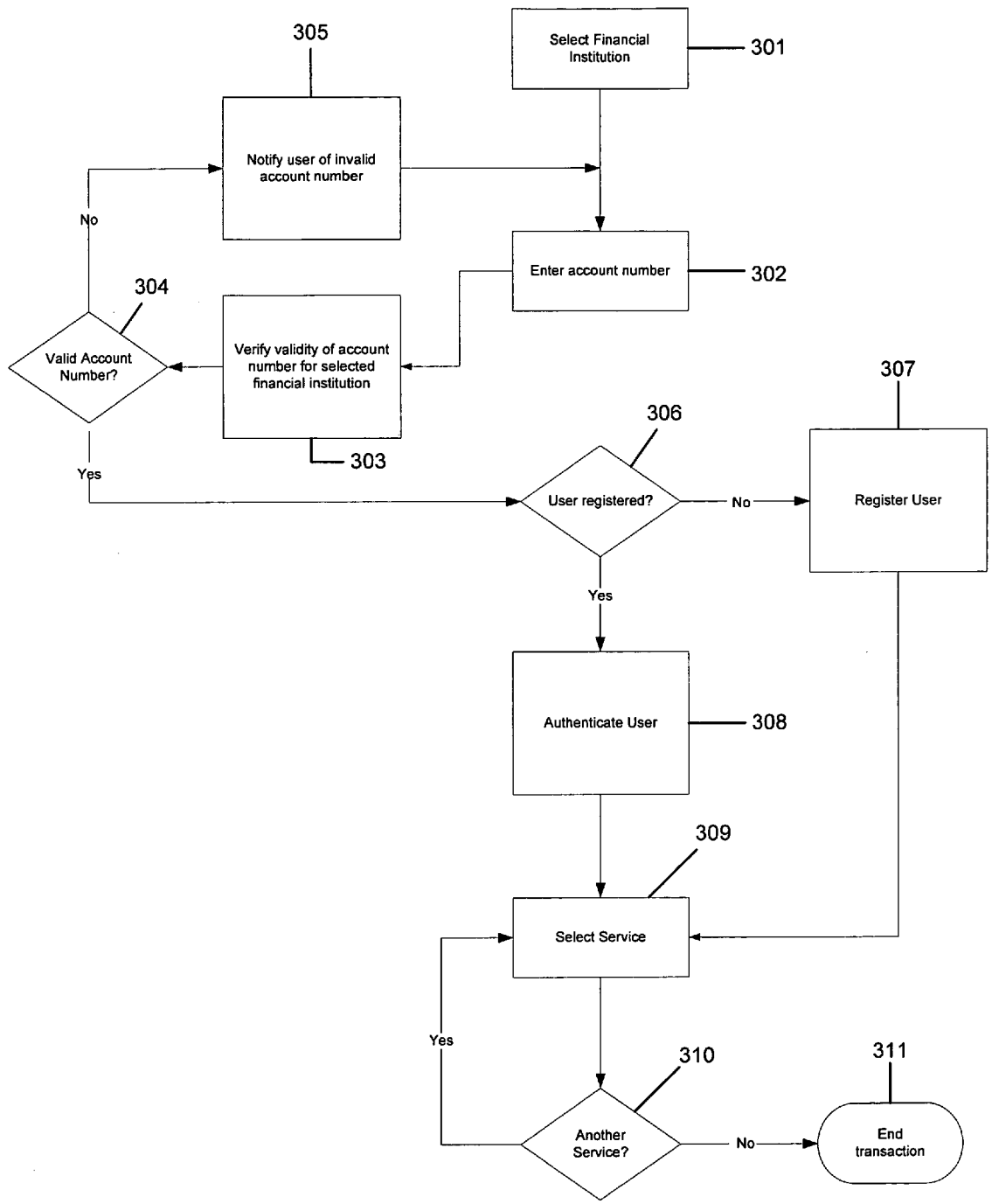
FIG. 3 illustrates a method of authenticating a user according to one embodiment of the present invention.

FIG. 3 illustrates a method of authenticating a user according to one embodiment of the present invention. At step 301 a user selects a financial institution. For example, a user may user a touch screen interface to spell out the name of his or her financial institution. At step 302, the user enters his or her account number. At step 303, the kiosk verifies the validity of the account number for the selected financial institution. For example, after an account number is entered, the data is sent over an Internet-based network through the shared branching network to be compared against a database at the selected financial institution. At step 304, the user is notified of the validity of the account number. If the number is invalid, the user is prompted at step 305 to re-enter the account number. If the number is valid, it will be compared against a remote database at step 306 to determine if the user has already registered. If the user has not registered, the user will be prompted to register at step 307. At step 308, a registered user will be prompted to present authentication information. For example, the user may enter a 4-digit PIN and insert a driver's license or any bank card with their name on it. When the card is swiped, the system compares the name on the card with the name(s) of the primary account holder as well as any joint account holders. The account holder is granted access only if the name on the card matches any of these names on file. Once the user is authenticated, they are presented with a menu of services and features at step 309 that would be available to them as if they were in their own financial institution. A unique service offered is the ability to dispense cashier's checks. Previously, account holders must visit a financial institution in person to obtain a cashier's check from a teller. After a service has been performed and completed, the user is asked at step 310 if another service is needed. If another service is needed, the user will be returned to step 309. If the user indicates that they do not want to select another service, the transaction will end and the user is logged out at step 311.

Figure 4:
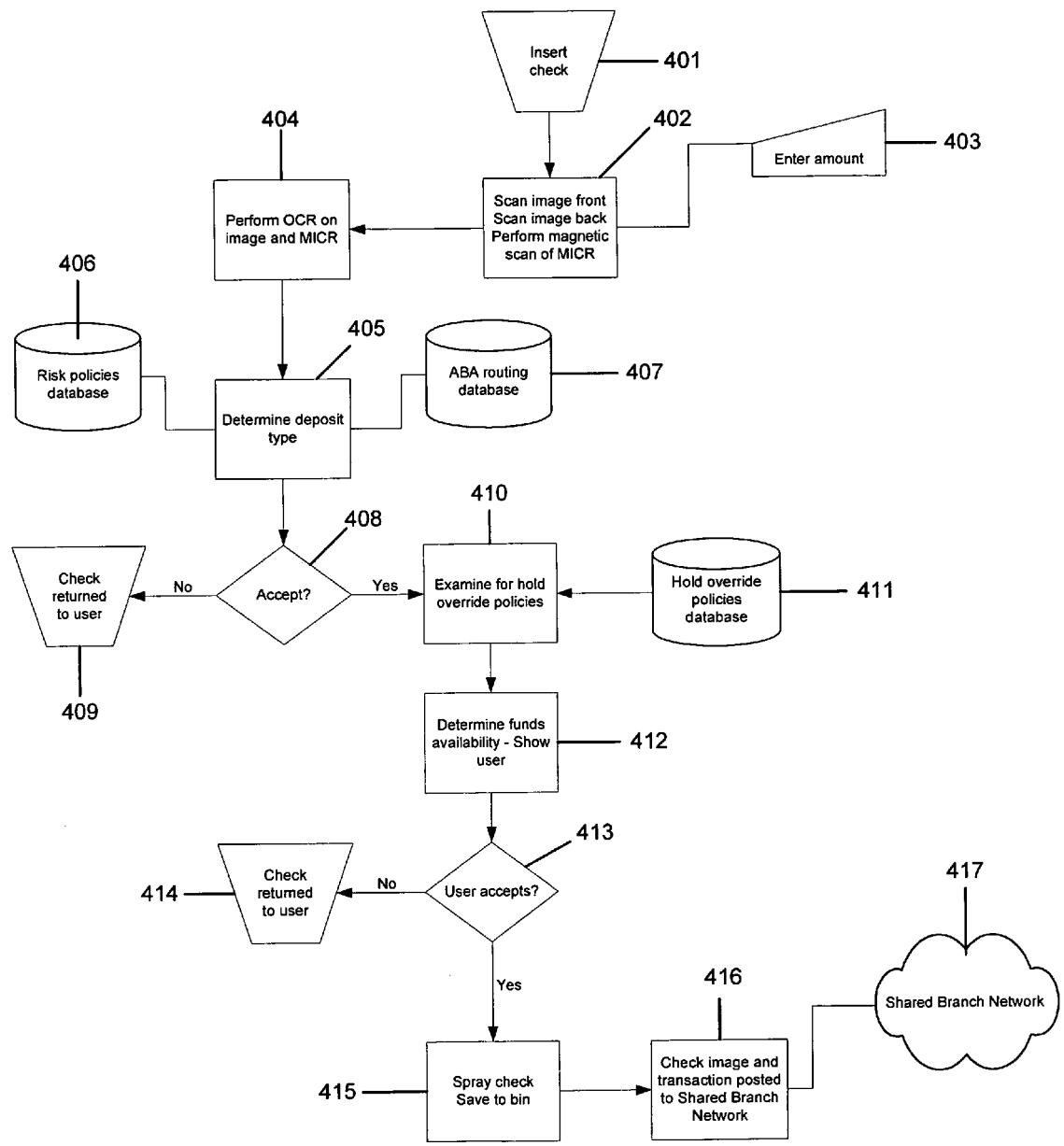
FIG. 4 illustrates a method of performing a transaction on a network according to one embodiment of the present invention.

FIG. 4 illustrates a method of performing a transaction on a network according to one embodiment of the present invention. FIG. 4 illustrates a method of performing a deposit transaction. At step 401, a user inserts a check into an image scanner at a kiosk. At step 402, the back and front of the check are scanned and the images are stored (e.g. bitmaps). The magnetic encoding ("MICR") at the bottom of the check is also scanned. The user enters the amount of the deposit using a touchscreen keypad at step 403. At step 404, the bitmap images and MICR obtained from step 402 are passed to an optical character recognition ("OCR") program. OCR will perform several functions. It will re-read the MICR using optical instead of magnetic techniques. It will detect the check amount, payee name, and check number. It will detect the imprinted name of the paying financial institution. It will determine if a signature is present on the front of the check. It will also determine if a signature is present in the endorsement section on the back of the check. A deposit type is determined at step 405 using the information obtained from step 404. In making this determination, risk policies and routing group information from database tables 406 and 407 are used. If deposit is rejected at step 408, the check is returned to the user. If the deposit is accepted, it will be examined for hold override policies using policy information stored in database 411. Funds availability is calculated and presented to the user at step 412. If the user rejects the deposit at step 413, then the check will be returned at step 414. If the user elects to proceed, deposit information will be printed on the check and stored in a secure internal bin at step 415. At step 416, the check images and deposit information will be posted through the shared branching network 417 to be received by the appropriate financial institution.

Figure 5A:
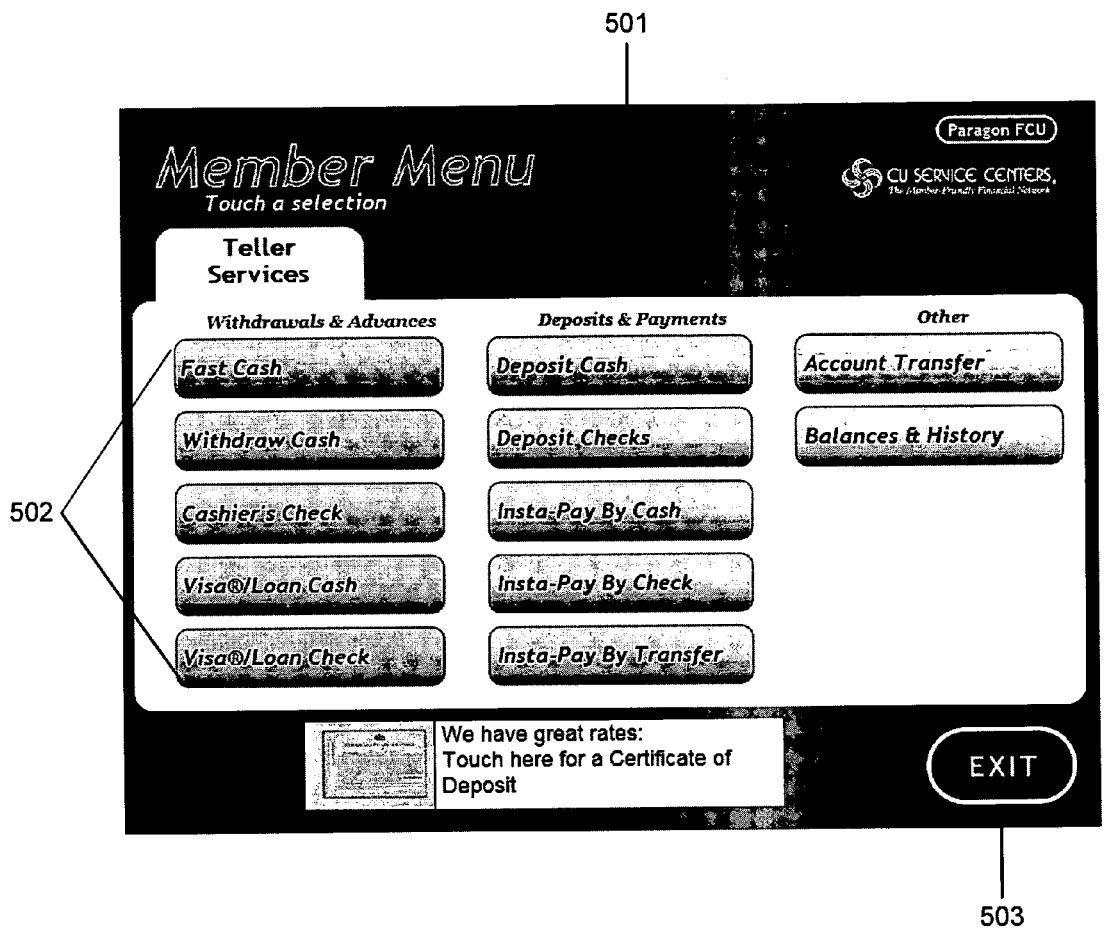
FIGS. 5A-E are example graphical user interfaces illustrating a deposit transaction according to another embodiment of the present invention.
Figure 5B:
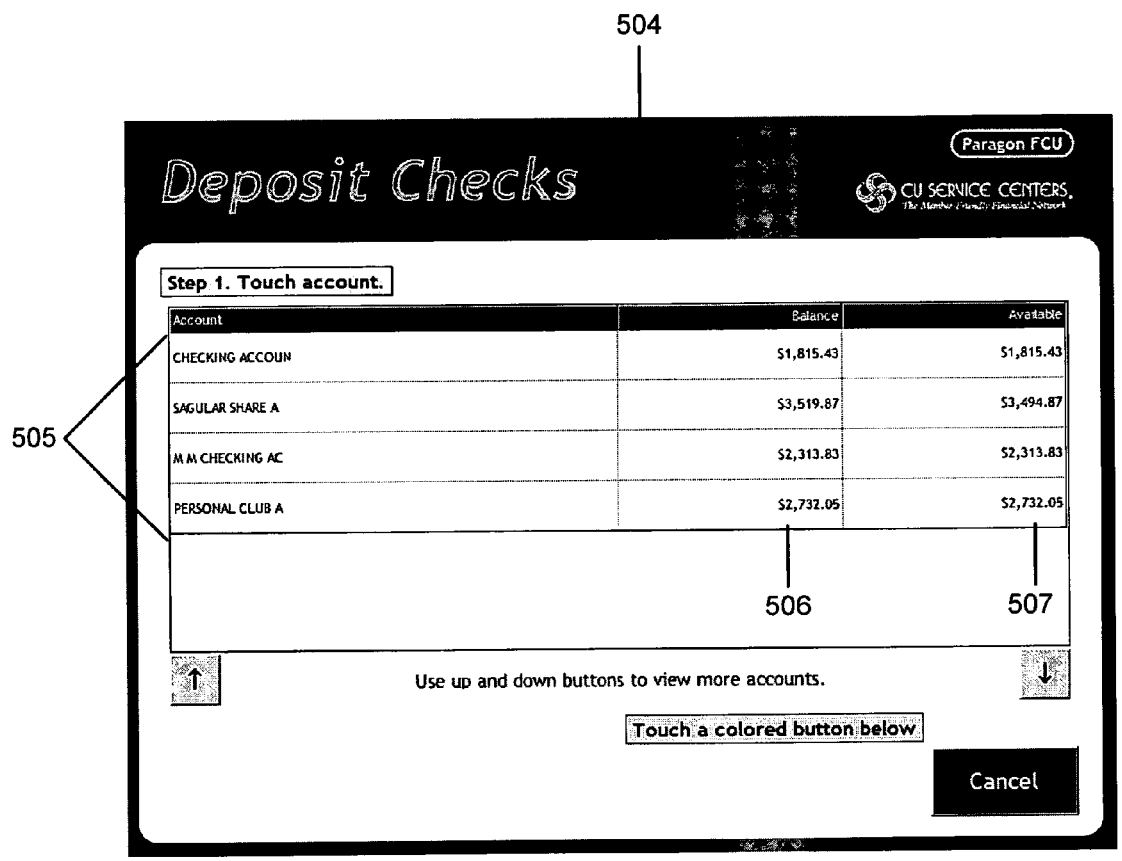
Figure 5C:
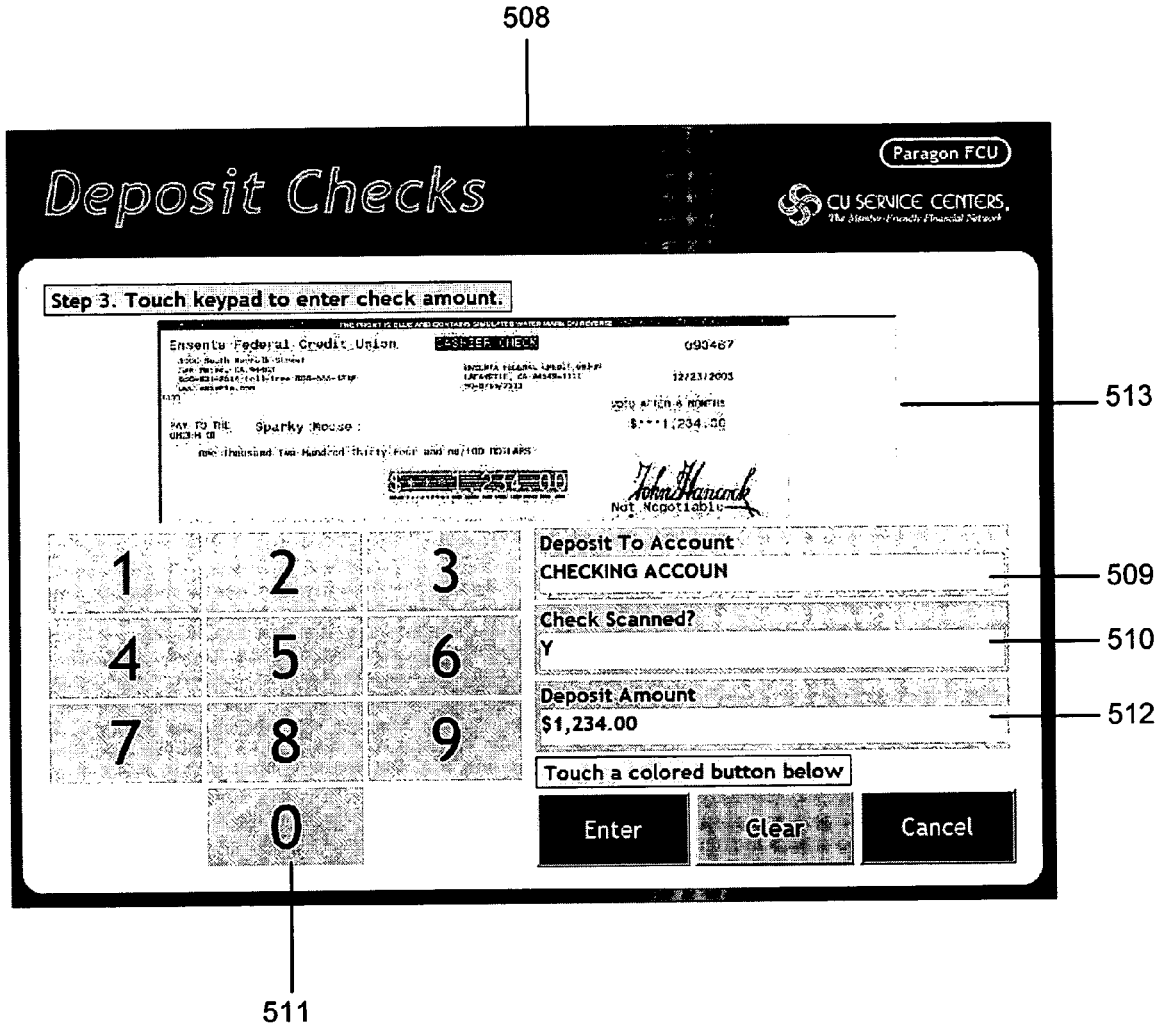
Figure 5D:
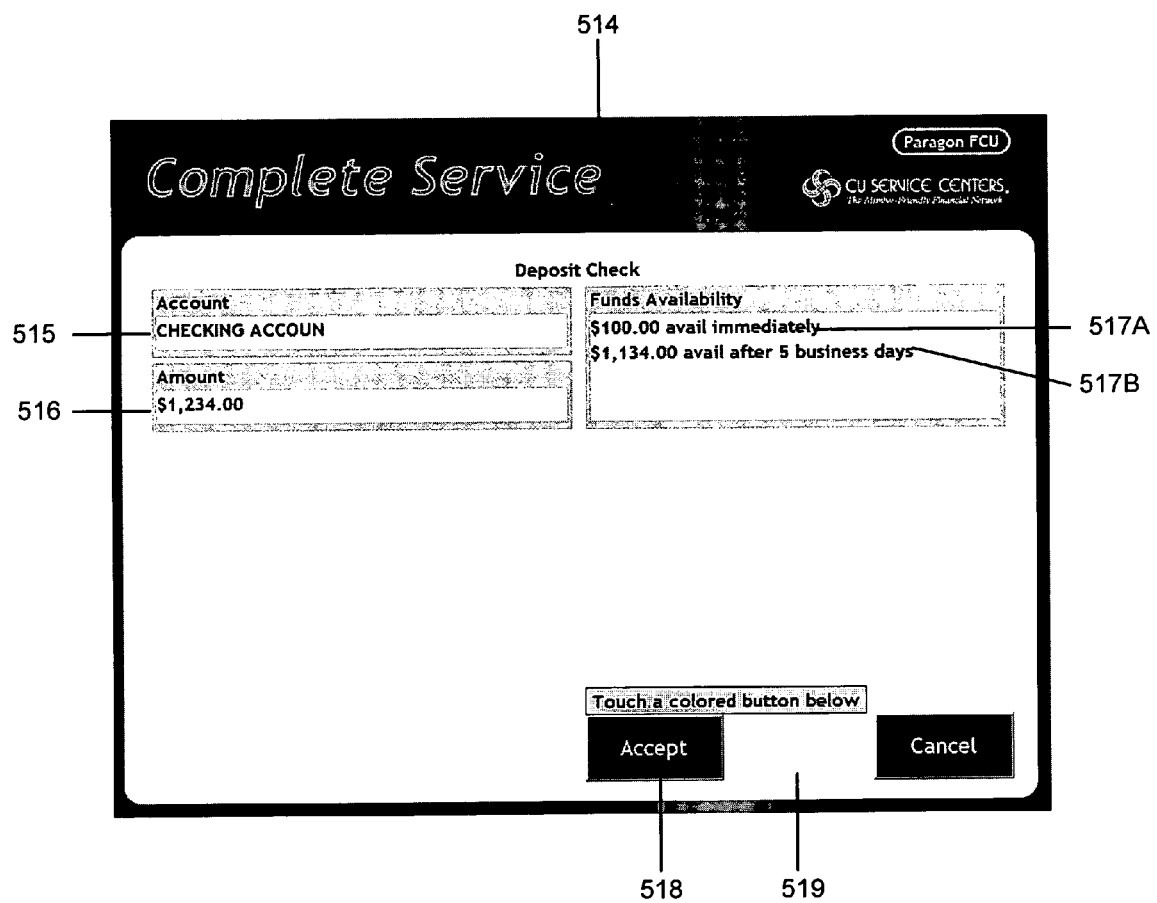
Figure 5E:
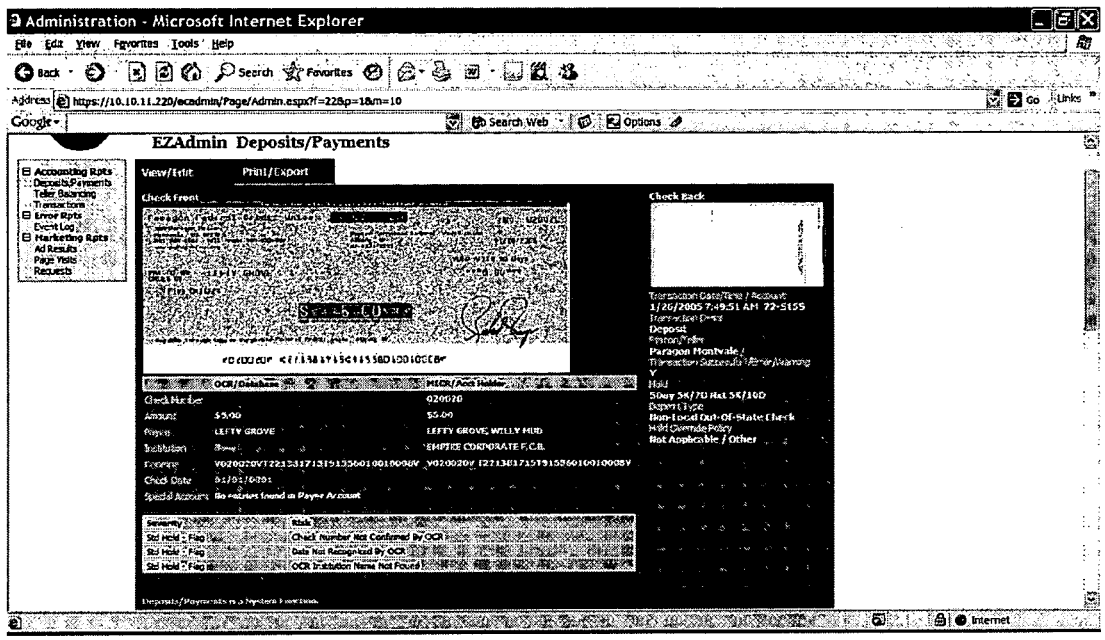

FIGS. 5A-E are example graphical user interfaces illustrating a deposit transaction according to another embodiment of the present invention. FIG. 5A illustrates a menu of services 501 that is presented to the user. The user will select a service by touching a labeled button 502. If the user wants to end the transaction, he or she can touch the exit button 503. FIG. 5B illustrates a listing of the user's accounts 504. Each account is displayed with the account type 505, the balance 506, and the available funds 507. The user selects the account that will be receiving the deposit. FIG. 5C illustrates a check deposit 508. A check is inserted into an image scanner without an envelope. The account type 509 is displayed. Verification of check scan 510 is displayed. The user uses a keypad 511 to enter the deposit amount 512. An image 513 of the check is displayed to the user. FIG. 5D illustrates an appraisal of funds availability. The account type 515 is displayed. The deposit amount 516 is also displayed. The funds that are immediately available are displayed at 517A. The availability of the remaining funds is displayed at 517B. The user can reject the deposit by touching button 519 or button 518 to accept. If the deposit is accepted, the deposit information is stored in a remote database that may be accessed by the user's financial institution. For example, after the transaction has completed, FIG. 5E illustrates instant online review of the deposit. A financial institution employee can review the details of the deposit and also see an image of the actual check. Previously, a check must be placed into an envelope for deposit. The envelope then sits in a depository until a teller can process the deposit and determine the availability. A user can then find out what the funds availability is through contacting the financial institution. The institution may also send a letter to the account holder's home with the funds availability.

Figure 6:
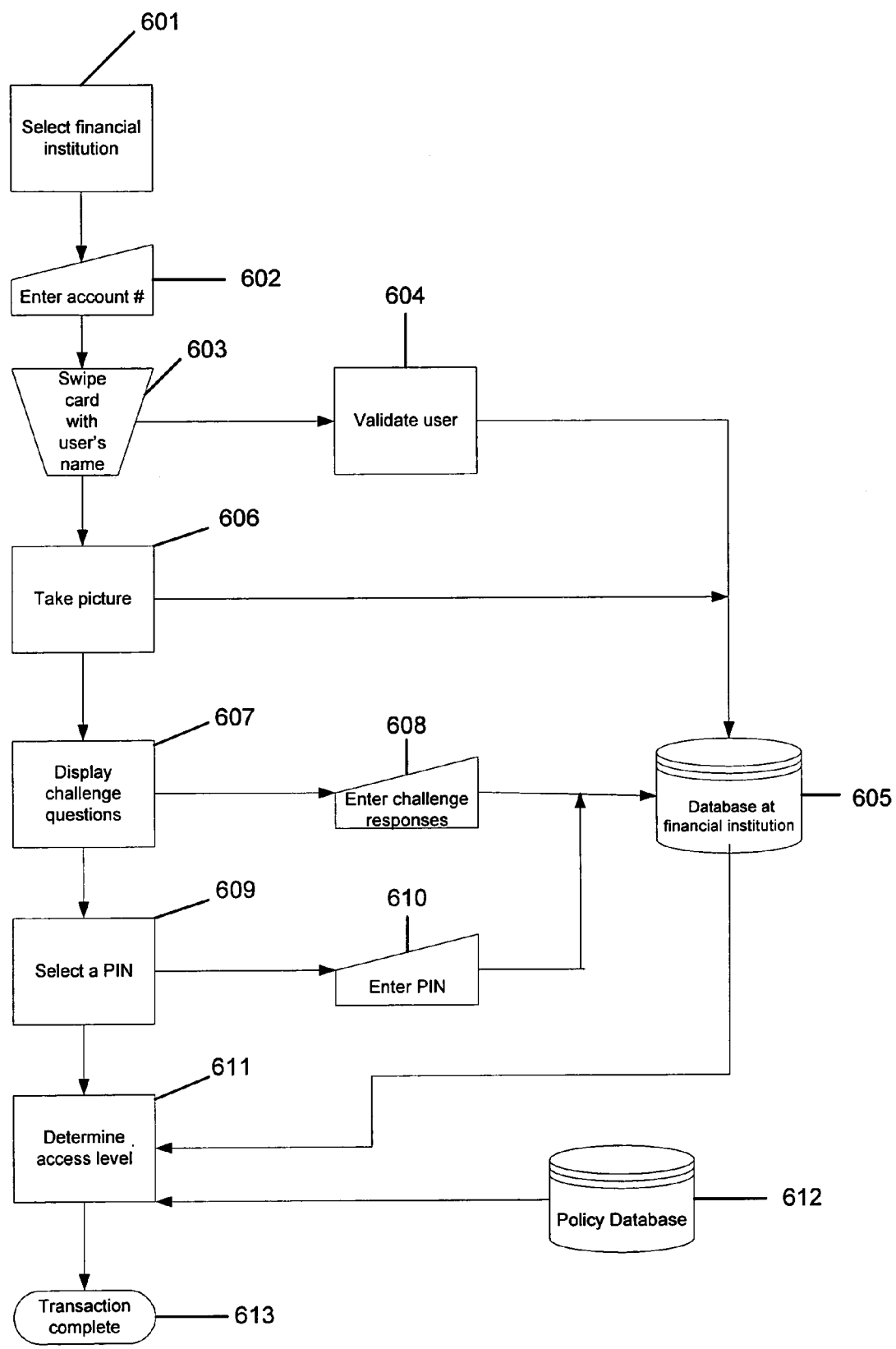
FIG. 6 illustrates a method of self-registering a user according to one embodiment of the present invention.

FIG. 6 illustrates a method of self-registering a user and personal identification number ("PIN") selection according to one embodiment of the present invention. At step 601, a user selects the name of their financial institution. The user enters their account number at step 602. At step 603, the user swipes a driver's license or any card with a magnetic strip. The name of the user is identified at step 604 and is stored in a user credentials database 605. This adds an additional authentication mechanism. The card information provides additional security since it is relatively difficult to forge such a card compared to the efforts required to acquire other account holder information. A picture of the user will be taken and stored in database 605. The user will be asked several challenge questions at step 607. For example, the user may be asked for his or her social security number, street address, and zip code. At step 608, the user enters responses to the questions and are stored in database 605. After the user has been successfully identified, the user is prompted to select a personal identification number ("PIN") at step 609 which they can use for future access. At step 610, the user enters a PIN using the touchscreen keypad and is stored in database 605. Based on the results of the initial registration and policies in the policy database 612 specific to the financial institution, the user is given an appropriate level of access to their accounts at step 611. The registration transaction completes at step 613.

Figure 7:
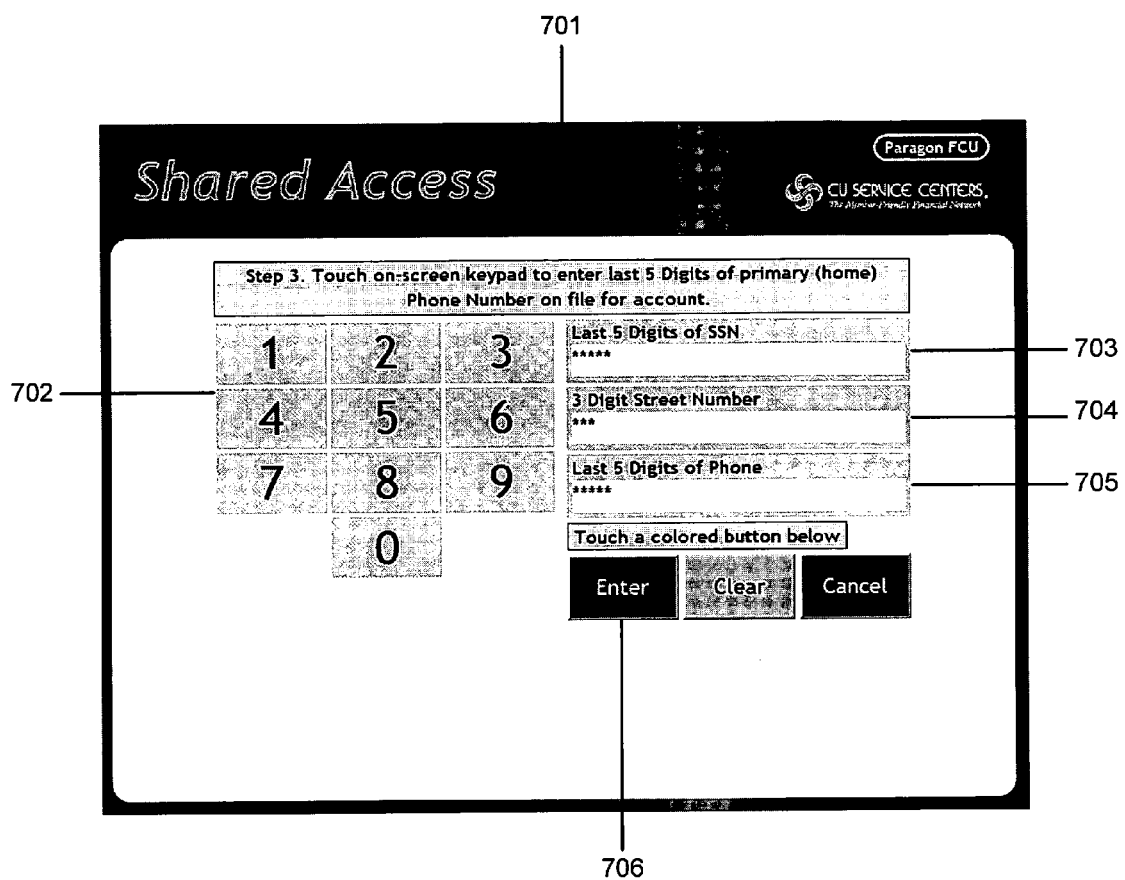
FIG. 7 is an example graphical user interfaces illustrating self-registration according to another embodiment of the present invention.

FIG. 7 is an example graphical user interface illustrating one of the steps in the self registration method according to another embodiment of the present invention. Interface 701 prompts the user to answer three challenge questions. Using keypad 702, the user enters responses to questions 703, 704, and 705. To confirm the responses, the user will touch button 706.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of performing a financial transaction on a network comprising:
   storing a plurality of risk factors and a plurality of severities in a web-enabled remote policy database, wherein the severities are selectable by a user at a financial institution, and wherein the user associates one of the plurality of severities in the remote policy database with a particular risk factor from a financial institution over the network, wherein the risk factors are conditions for controlling the processing of a deposit, and wherein a particular severity associated with the particular risk factor defines actions taken when the particular risk factor is detected, and wherein different risk factors are associated with different, and wherein the policy database further comprises hold policies that associate a deposit type with a hold type;
   receiving deposit data in a server from a kiosk over the network;
   applying the risk factors to the deposit data; and
   performing, on the server, a first action corresponding to a first severity if one of said risk factors is detected.

2. The method of claim 1 further comprising hold override policies defined by an issuer.

3. The method of claim 1 wherein the severities are defined by a shared branching network.

4. The method of claim 1 wherein the severities are defined by an issuer.

5. The method of claim 1 wherein the severities are defined by an acquirer.

6. The method of claim 1 wherein severities are defined by at least two of a network administrative authority, an issuer, or an acquirer, and the strictest severity is applied when a risk factor is detected.

7. A computer-implemented method of performing a financial transaction on a network comprising: storing a plurality of risk factors and plurality of severities in a web-enabled remote policy database, wherein the severities are selectable by a user at a financial institution, and wherein the user associates one of the plurality of severities in the remote policy database with a particular risk factor from a financial institution over the network, wherein the risk factors are conditions for controlling the processing of a deposit, and wherein a particular severity associated with the particular risk factor defines actions taken when the particular risk factor is detected, and wherein different risk factors are associated with different severities wherein storing a plurality of hold policies that associate a deposit type with a hold type in the policy database; receiving deposit data including an image of a deposit check from a kiosk in a server over the network; and on the server, applying the plurality of risk factors to the deposit data; and applying the plurality of hold policies to the deposit data.

8. The method of claim 7 wherein a financial institution accesses the policy database over the network.

9. The method of claim 7 wherein a financial institution modifies the risk factors over the network.

10. The method of claim 7 wherein the network is a shared branching network.

11. The method of claim 7 wherein the hold policies include hold override policies defined by an issuer.

12. The method of claim 7 wherein the severities are defined by a shared branching network administrative authority.

13. The method of claim 7 wherein the severities are defined by an issuer.

14. The method of claim 7 wherein the severities are defined by an acquirer.

15. The method of claim 7 wherein severities are defined by at least two of the network, the issuer or the acquirer and the strictest severity is applied when a risk factor is detected.

16. The method of claim 1 wherein different financial institutions specify different risk factors and associated severities for processing different deposit data, and wherein first deposit data associated with a first financial institution is processed using first risk factors and associated severities and second deposit data associated with a second financial institution is processed using second risk factors and associated severities.

17. The method of claim 1 wherein different kiosk owners specify different risk factors and associated severities for processing different deposit data, and wherein first deposit data associated with a first kiosk is processed using first risk factors and associated severities and second deposit data associated with a second kiosk is processed using second risk factors and associated severities.

18. The method of claim 1 wherein the web enabled remote policy database is accessible by a plurality of financial institutions or a plurality of kiosk owners for specifying different risk factors and associated severities to be used when processing deposit data.

19. An apparatus comprising: a server coupled to a network for processing data; and a web-enabled remote policy database, the remote policy database storing a plurality of risk factors and a plurality of severities, wherein the severities are selectable by a user at a financial institution, and wherein the user associates one of the plurality of severities in the remote policy database with a particular risk factor from a financial institution over the network, wherein the risk factors are conditions for controlling the processing of a deposit, and wherein a particular severity associated with the particular risk factor defines actions taken when the particular risk factor is detected, and wherein different risk factors are associated with different severities, wherein the policy database further comprises hold policies that associate a deposit type with a hold type, and wherein deposit data is receive in the server from a kiosk over the network, and wherein the risk factors are applied to the deposit data, and a first action corresponding to a first severity is performed if one of said risk factors is detected.

20. The apparatus of claim 19 wherein different financial institutions specify different risk factors and associated severities for processing different deposit data, and wherein first deposit data associated with a first financial institution is processed using first risk factors and associated severities and second deposit data associated with a second financial institution is processed using second risk factors and associated severities.

21. The apparatus of claim 19 wherein different kiosk owners specify different risk factors and associated severities for processing different deposit data, and wherein first deposit data associated with a first kiosk is processed using first risk factors and associated severities and second deposit data associated with a second kiosk is processed using second risk factors and associated severities.

22. The apparatus of claim 19 wherein the web enabled remote policy database is accessible by a plurality of financial institutions or a plurality of kiosk owners for specifying different risk factors and associated severities to be used when processing deposit data.

* * * * *